US004001677B2

United States Statutory Invention Registration [19]

[11] Reg. Number: H1677

Hu et al.

[45] Published: Sep. 2, 1997

[54] CONTROL MODULE FOR CONTROLLING THE OPERATION OF A MULTIFUNCTIONAL PERIPHERAL DEVICE

[75] Inventors: Darwin Hu; Jim Lo; Tokuhiro Hasegawa; Banky Mor; Nobuyuki Sato, all of San Jose, Calif.

[73] Assignee: Oki America, Inc., Hackensack, N.J.

[21] Appl. No.: 189,261

[22] Filed: Jan. 28, 1994

Related U.S. Application Data

[63] Continuation of Ser. No. 771,909, Oct. 4, 1991, abandoned.

[51] Int. Cl.[6] ..... H04N 1/32

[52] U.S. Cl. ..... 358/468; 358/400; 358/442

[58] Field of Search ..... 358/426, 400, 358/401, 442, 444, 468, 404

[56] References Cited

U.S. PATENT DOCUMENTS

| | | | |
|---|---|---|---|
| 4,513,390 | 4/1985 | Walter et al. | 358/403 |
| 4,587,633 | 5/1986 | Wong et al. | 358/444 |
| 4,652,933 | 3/1987 | Koshiishi | 358/256 |
| 4,754,300 | 6/1988 | Fukae | 355/3 R |
| 4,760,458 | 7/1988 | Watanabe et al. | 358/452 |
| 4,794,419 | 12/1988 | Shibazaki et al. | 355/3 R |
| 4,814,798 | 3/1989 | Fukae et al. | 346/160 |
| 4,821,107 | 4/1989 | Naito et al. | 358/256 |
| 4,860,115 | 8/1989 | Ogura | 358/443 |
| 4,876,609 | 10/1989 | Ogura | 358/443 |
| 4,905,098 | 2/1990 | Sakata | 358/468 |
| 4,910,607 | 3/1990 | Kita et al. | 358/400 |
| 4,914,525 | 4/1990 | Abe et al. | 358/498 |
| 4,947,345 | 8/1990 | Paradise et al. | 364/519 |
| 4,949,188 | 8/1990 | Sato | 358/462 |
| 4,959,731 | 9/1990 | Fukae | 358/300 |
| 4,964,154 | 10/1990 | Shimotono | 358/442 |
| 4,992,884 | 2/1991 | Sakata | 358/401 |
| 5,041,918 | 8/1991 | Ishida et al. | 358/442 |
| 5,062,136 | 10/1991 | Gattis et al. | 358/426 |
| 5,091,790 | 2/1992 | Silverberg | 358/434 |

FOREIGN PATENT DOCUMENTS 0048118 3/1982 European Pat. Off. .

*Primary Examiner*—Bernarr E. Gregory
*Attorney, Agent, or Firm*—Panitch Schwarze Jacobs & Nadel, P.C.

[57] ABSTRACT

A control module controls the operation of a multifunctional peripheral device. A control bus receives data from at least one auxiliary device associated with the control module. A control processor processes the received data. A control memory stores the received data. A video interface converts the received data into video data signals which are transmitted to the multifunctional peripheral device.

12 Claims, 15 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTROL MODULE FOR CONTROLLING THE OPERATION OF A MULTIFUNCTIONAL PERIPHERAL DEVICE

This application is a continuation of U.S. application 07/771,909, filed Oct. 4, 1991, now abandoned.

BACKGROUND OF THE INVENTION

The present invention relates to a multifunctional document processing system and, more particularly, to a control module for controlling the operation of a multifunctional peripheral device based on data signals received from or transmitted to an auxiliary device.

Most modern offices have separate machines for scanning documents, sending and receiving faxes, printing documents and copying documents. Each separate machine is restricted to its own particular function and occupies a predetermined amount of office space. If a document is faxed to a remote location and additional copies of the document need to be made, a facsimile machine must be used to fax a copy of the document to the remote location and a separate copier must be used to make additional copies of the document. The use of two separate machines to accomplish relatively similar functions can be time consuming, particularly if each machine is located in a different area of the office. In addition, two or more machines can be expensive to acquire and maintain and often require at least twice as much office space as a single machine which could perform multiple functions.

In addition, many offices use word processors or personal computers (hereinafter collectively referred to as a personal computer) to create and edit documents. A separate printer, such as a laser printer, LED printer, etc., is usually associated with the personal computer so that printed copies of documents may be obtained from the personal computer. A copy of each document is normally stored within a hard disk or other long term storage device associated with the personal computer or on a separate floppy disk so that the document can be retrieved at a later point in time if additional copies of the document are needed or to permit editing of the document. If the document is to be edited or revised, the document is retrieved from the memory of the personal computer and the changes are made. A printed copy of the revised version of the document can be obtained by entering the appropriate instructions into the personal computer for activating the printer to print a copy of the document.

Most other office machines, such as fax machines, copiers and optical scanners are incapable of creating or revising a document. Such machines are only capable of accepting documents which are in final form and, in the case of a fax machine, normally must be printed on a type of paper suitable for faxing. For example, if a document is to be faxed to a remote location and, prior to faxing, the document must be changed, the document must be retrieved from the memory of the personal computer, revised, and reprinted on the printer before it is ready be supplied to the fax machine to be faxed. This multi-step, multi-machine operation can be a time consuming process which can ultimately lower the efficiency of an office.

There is a strong need for a single apparatus or device which is capable of functioning in conjunction with a host computer for scanning, faxing, printing and copying a document. In addition, it is necessary to have a suitable interface between the host computer and the multifunctional peripheral device capable of receiving and transmitting data signals which control the functional operations occurring between the host computer and the multifunctional peripheral device. In the event that facsimile transmissions are to be received and transmitted by the multifunctional peripheral device, the interface must be capable of receiving and transmitting data signals to a remote source via the telephone lines.

The present invention is directed to a control module for controlling the operation of a multifunctional peripheral device based on data signals transmitted or received by an auxiliary device. The control module receives data signal inputs which are processed to determine which control instructions are to be implemented. The control module includes a control data bus for receiving and transmitting data signals to a plurality of auxiliary devices and a video data bus for transmitting or receiving video signals to the multifunctional peripheral device. The control module controls the flow of data signals and determines what functions are to be performed by the multifunctional peripheral device.

A multifunctional data processing system is designed to be user friendly and can be employed for accomplishing a variety of tasks. For example, if a user wanted to prepare a resume and incorporate a photograph, the text portion of the resume can be prepared utilizing the word processing features of the host computer and the photograph can be scanned into the host computer utilizing the scanner on the multifunctional document processing system. The host computer can then integrate the photograph with the text and the resulting resume can be printed on the printer of the multifunctional document processing system.

In order for the printer or multifunctional peripheral device to perform the proper function, it must receive the proper signals from the control module. In addition, a previously printed paper which is not stored in the host computer can be updated or changed by scanning the paper into the host computer using the scanner. The changes can then be made to the paper utilizing the word processing features of the host computer and the revised document can be printed out on the printer of the multifunctional document processing system. The system also permits a single document stored within the memory of the host computer to be sequentially faxed to multiple fax machines at multiple remote locations utilizing fax software within the host computer. Incoming faxes which are received by the system are stored in the memory of the host computer for later printout. The system provides for identified fax documents to be stored in specifically identified memory locations (i.e., mailboxes) within the host computer for later retrieval and/or printout only by a particular person to whom the fax is addressed under the control of a particular security code or password. The system also permits the addressee of a fax to retrieve the fax from a remote location utilizing another fax machine or another multifunctional document processing system.

It is clear that the multifunctional document processing system is more versatile and is able to perform additional tasks or functions which could not be readily performed utilizing a separate printer, scanner and/or fax machine as is done with the prior art. However, for all these functions to be properly performed, it is necessary to have a control module which is capable of properly directing the data and carrying out the desired function.

SUMMARY OF THE INVENTION

Briefly stated, the present invention is directed to a control module for controlling the operation of a multifunctional peripheral device based on data signals received or transmitted by an auxiliary device. The control module includes data receiving means for receiving data from at least one auxiliary device associated with the control module. Data processing means are employed for processing the received data. Data storage means are utilized for storing the received data. Video conversion means are employed for converting the received data into video data signals which are transmitted to the multifunctional peripheral device.

BRIEF DESCRIPTION OF THE DRAWING

The foregoing summary, as well as the following detailed description of a preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DESCRIPTION OF THE PREFERRED EMBODIMENT

Figure 1:
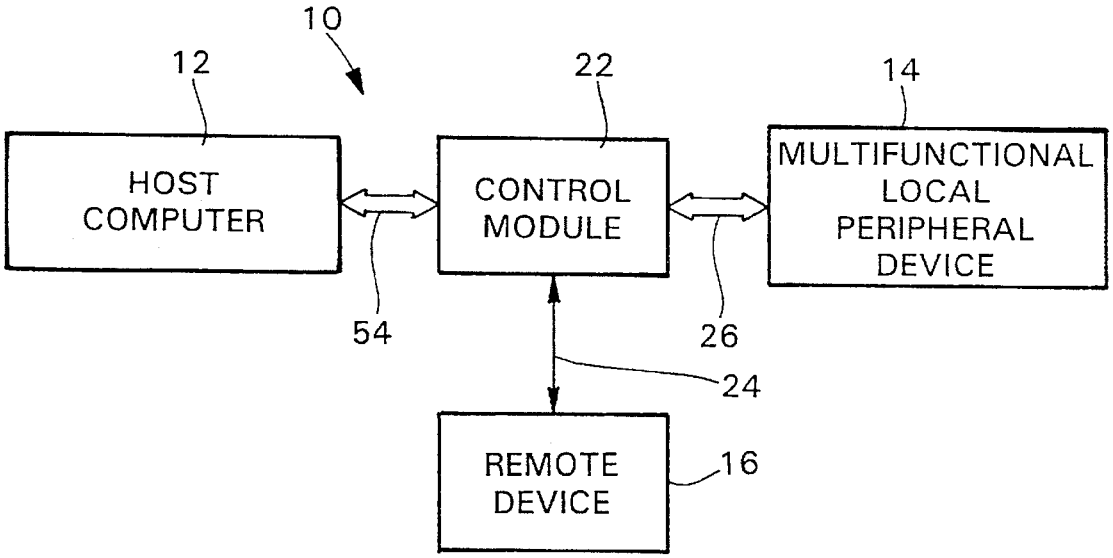
FIG. 1 is a schematic block diagram of a preferred embodiment of a document processing system in accordance with the present invention.
Figure 2:
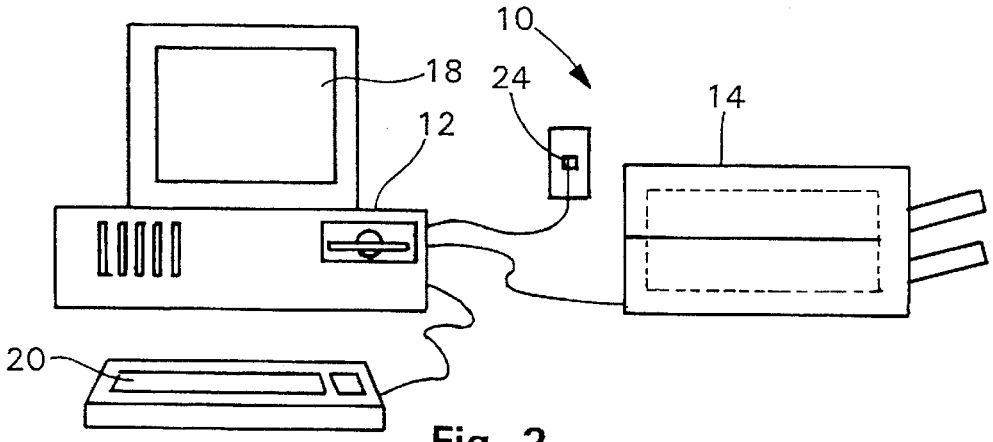
FIG. 2 is an elevational view of a typical personal or host computer and a multifunctional local peripheral device of the document processing system of FIG. 1.

Referring to the drawings wherein like numerals indicate like elements throughout, there is shown in FIGS. 1 and 2, an embodiment of a document processing system 10 in accordance with the present invention. The document processing system 10 comprises a host computer 12 which receives document signals from a local device 14 or a remote device 16, and processes the document signals for transmission of the document signals to the local device 14 or the remote device 16. The local device 14 is preferably a multifunctional local peripheral device (MLPD) or sometimes referred to as an SPCX, which is capable of scanning, faxing, copying or printing a document. The host computer 12 which is illustrated in FIG. 2 is preferably a personal computer, such as, but not limited to, an IBM or an IBM compatible computer. It is to be understood by those skilled in the art that any other brand or type of computer system, word processing system, whether networked or stand alone, or any other type of related device could be used in conjunction with the document processing system 10 without departing from the spirit and scope of the present invention. The terms personal computer and host computer are used herein only for the sake of brevity and should not be considered a limitation on the present invention.

The host computer 12 as illustrated includes a hard disk (not shown) as well as a main memory (not shown) which together act as the main storage data facility or memory of the host computer 12 in the usual manner wellknown in the art.

Document signals received from the local device 14 and the remote device 16 are stored within the memory of the host computer 12 until the signals are retrieved and processed. Auxiliary storage devices, such as floppy discs or the like can also be used to store the document signals received from the local device 14 or the remote device 16 for later processing of the document signals.

The host computer 12 can include a visual display device 18, such as a CRT, for displaying a document on-line. A user of the document processing system 10 can retrieve document signals from the memory of the host computer 12 and can display the document on the visual display device 18 for editing or otherwise changing the document. In addition, a keyboard 20 can be associated with the host computer 12 for creating and revising documents which can be stored within the memory. The keyboard 20 may also be used for inputting instruction commands to the host computer 12 and to the local device 14. It is to be understood by those skilled in the art that any form of editing or creating device can be also used in conjunction with the host computer 12, such as, but not limited to, a touch screen, a laser pen, a mouse or the like.

The host computer 12 is interfaced with a control module 22 which passes document signals between the host computer 12 and the local device 14 or the remote device 16. The control module 22 converts the data format received from the host computer 12 which is usually parallel I/O bus 54 having a sixteen or thirty-two bit wire signal path to a video data path accepted by the MLPD 14 which usually has four or fewer signal paths, i.e., a serial data bus. The control module 22 is preferably a self-contained plug-in printed circuit board or card which can be conveniently inserted within an available I/O port (not shown) within the host computer 12. However, it is to be understood by those skilled in the art that the control module may also be a separate unit or may be incorporated into the local device 14. The control module 22 is an intelligent controller which controls all communication, printer emulation, printer, scanner and fax functions within the document processing system 10.

The host computer 12 includes driver software (not shown) which interfaces the control module 22 to applications programs running within the host computer 12. The driver software includes a routine which converts data from an application program to a sequence of control and data operations adapted for a particular hardware interface such as a CPU I/O bus 54. The driver software is also capable of converting data from a sequence of control and data operations to a data format suitable for input to an application. It is to be understood by those skilled in the art that the data format for the input and output of data from an application may be standardized, thereby allowing the driver software written for new hardware devices to permit the unmodified application to use diverse peripherals.

When a local function is to be performed such as printing or copying a document, the document signals are transmitted from the host computer 12 to the control module 22, which transfers the document signals to the local device 14. In the preferred embodiment, the local device is a multifunctional local peripheral device (MLPD) 14 which is essentially a dumb device that responds only to document signals received from the host computer 12. The MLPD 14 preferably includes scanning means, such as a standard optical scanner for optically scanning document information and converting the scanned document information into electrical document signals. The MLPD 14 also includes a recording or printing means, such as a standard printer for receiving document signals from the host computer 12 and for producing a recorded form of the document information for example a printed document based on the received document signals. In the presently preferred embodiment, the optical scanner is a removable hand held scanner and the printer is a standard LED printer, such as an OL800 printer which is commercially available from Okidata, Inc. It should be recognized that any other type of scanner and/or recording device, such as a film recorder, screen or other such device could alternatively be employed.

Figure 3:
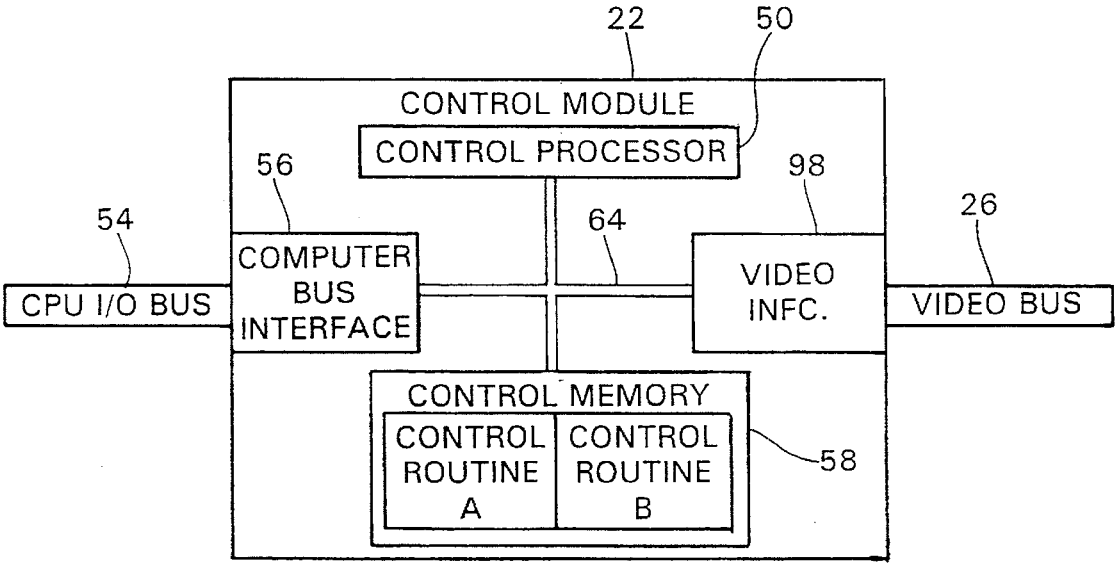
FIG. 3 is a schematic block diagram of the control module of the document processing system of FIG. 1.
Figure 4:
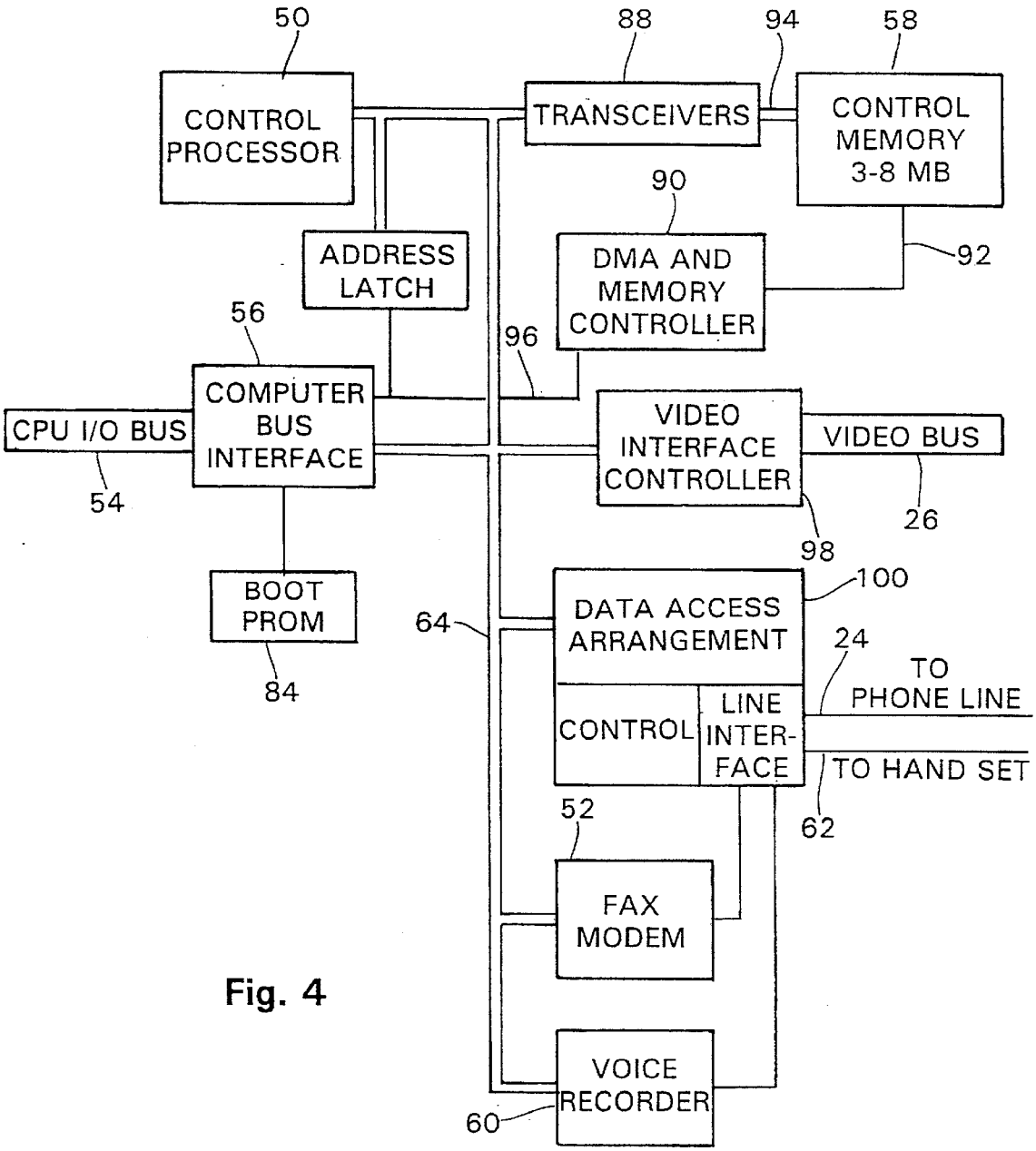
FIG. 4 is a more detailed schematic block diagram of the control module of FIG. 3.

Referring specifically to FIGS. 3 and 4, the host computer 12 transmits document signals to the control module 22 over a CPU I/O bus 54. The control module 22 receives the document signals over a local computer bus interface 56. The computer bus interface 56 directs the document signals to a control processor 50 for further processing via a control bus 64. In the preferred embodiment, the control bus 64 is a 32-bit or 64-bit local bus.

The control processor 50 of the preferred embodiment is preferably a 32-bit processor, such as an Intel 80960 processor. The processor 50 can also be a 16-bit or a 64-bit processor. The processor 50 receives document signals from the host computer 12 via the CPU I/O bus 54 and computer bus interface 56 and determines the function which is to be performed to the document signals, i.e., print, fax, etc., and the destination of the document signals, i.e., to the local device 14 or to the remote device 16. The functions which can be performed by the document signals are scanning a document, faxing a document to a remote location, receiving a document faxed from a remote location, copying a document, and printing a document.

Control routines for performing certain functions by the control processor 50 are contained within a control memory 58. The control memory 58 contains software well-suited for high speed processing which include facsimile compression and decompression algorithms. In the preferred embodiment, the facsimile compression and decompression algorithms are preferably of the CCITT T.30 and T.4 protocol. The control memory 58 can also contain printer control languages. Among the suitable printer control languages are the Epson printer language, the Hewlett Packard Laserjet III printer language, the Adobe Corp. Post Script page description language or the Microsoft True Image emulation of the Adobe Post Script language. The control memory 58 can further contain image processing software such as, but not limited to, software to facilitate dithering or image enhancement. In the preferred embodiment, the software routines are downloaded from the host computer 12. However, the software routines may also be stored in a nonvolatile memory (not shown).

The control module 22 further includes a facsimile modem 52 (FIG. 4) for transmitting or receiving facsimiles to or from a remote location via the remote device 16 which in the present embodiment is a remotely located fax machine or a similarly configurated multifunctional document processing system. The facsimile modem 52 operates in the usual well-known manner to transmit documents over a communicating medium 24, such as a switched telephone network and comprises 16 8-bit control registers (not shown). In the preferred embodiment, the facsimile modem 52 is an Oki KV96-XSD fax modem. However, it is to be understood by those skilled in the art that any suitable facsimile modem can be used without departing from the scope and spirit of the invention.

A voice recorder 60 may also be included within the control module 22 to provide audio messages to a user. The voice recorder 60 is attached to the handset 62 of a phone associated with the multifunctional document processing system 10. The voice recorder 60 has three modes. The first mode is that the voice recorder 60 is capable of remote recording and play back from a remote telephone. The second mode allows for local recording and play back from a local telephone and the third mode is play back from the voice recorder to a speaker. In the preferred embodiment, the voice recorder is an Oki Adaptive Digital Pulse Code Modulation (ADPCM) MSM6388 voice recorder. However, it is to be understood by those skilled in the art that any voice recorder can be used without departing from the scope and spirit of the invention.

A data access arrangement 100 (DAA) module routes telephone data from the communications medium 24 to either the telephone handset interface 62, the fax modem 52 or a voice recorder 60. The DAA 100 has two modular jacks and one speaker jack (not shown).

The first modular jack connects the DAA 100 to the communications medium 24. The second modular jack connects the DAA to the local handset 62.

The handset 62 provides three important features. The first feature is that the handset may be used to originate a call, sound an incoming ring or transfer verbal conversations. The second feature of the handset is that it acts as a recording and play back device for the purpose of sending voice mail. The handset 62 can act as a microphone and speaker for the voice recorder 60 depending on whether the voice mail is being transmitted or received. The third feature of the handset is that it acts as a monitoring speaker which monitors fax tones being transmitted and received over the communications medium 24.

A speaker (not shown) may also be connected to the DAA 100 and provides two features. The first feature is that the speaker acts as a line monitor for sounding out modem tones and voice chip tones which are transmitted or received from a remote device 16 via the communications medium 24. The volume of the speaker is adjustable. The second feature of the speaker is that it allows for local voice play back. The speaker is capable of playing back a message recorded on the voice recorder 60. During operation, the DAA 100 answers the phone and attempts to detect standard fax signalling tones. If a fax tone is detected, communication is routed to the facsimile modem 52. If a fax signal is not detected, the handset is activated for a predetermined number of rings. If the handset is not answered, the call is finally routed to the voice recorder 60 so that the caller may leave a message.

If the document signals received by the control processor 50 are to be faxed to the remote device 16 or have been received from the remote device 16, the processor 50 accesses the facsimile modem 52 for proper transmission or reception of the document signals. The processor 50 accesses the control registers of the facsimile modem 52 through an 8-bit parallel port (not shown). The parallel port transfers transmitting document signals and receiving document signals in an 8-bit data format.

A video interface 26 is located between the control module 22 and the MLPD 14 for transmitting information in the form of electrical document signals and control signals between the control module 22 and the MLPD 14, such as instructions for performing a particular function or status information. In the preferred embodiment, the interface 26 is a high speed serial video interface but some other appropriate interface, such as a small computer system interface (SCSI) could be employed. Data is transferred from the central data bus 64 into a 32 bit input register at the input of the video interface 26 when the video interface is addressed.

A second register, which is preferably a shift register, has a 32 parallel input and clocked serial output. The second register receives data in parallel from the input register whenever it is empty and the input register is full. A local video clock (not shown) clocks the data out the shift register serially onto the video bus. The video interface 26 also receives data from the video bus over a separate serial line. The data originates in the scanner mechanism of the MLPD 14 and is received in a 32 bit receiving shift register. When the receiving shift register is filled, it parallel loads a transmitting bus register which in turn communicates data to the central data bus 64.

Three types of document signals are communicated over the interface 26 from the control module 22 to the MLPD 14. The first type of signals transmitted to the MLPD 14 instruct the MLPD 14 to print a particular document based upon particular document signals received from the host computer 12. The second type of signals transmitted to the MLPD 14 instruct the MLPD 14 to scan a particular document utilizing the scanner and to transmit the document signals from the scanner to the host computer 12. The third type of document signals transmitted to the MLPD 14 act as a command or response communication to the MLPD 14 and include printer, scanner, operator panel and data flow control signals. All commands and responses are transferred between the MLPD 14 and the control module 22 along the same physical connection via the interface 26.

As discussed above, the control module 22 controls all printer, scanner and fax functions. When the control module 22 receives document signals from the host computer 12, the control module 22 first identifies what function is to be performed and at what destination. In the preferred embodiment, the document signals received by the control module 22 are coded so that the control module 22 can easily identify the function which is to be performed. The code is preferably one that is easily recognized by the control module processor 50. For example, if the control module 22 is to transmit document signals to the remote device 16, such as through a facsimile transmission, the document signals received from the host computer 12 are transferred within the control module 22 to the facsimile modem 52 which converts the document signals into the appropriate format and then transmits the document signals over a communication medium 24 to the remote device 16. In the preferred embodiment, the communication medium 24 is a telephone link. It is to be understood by those skilled in the art that any suitable communication medium or transmission device can be used such as, but not limited to a modem or a UART. The remote device 16 can be a conventional facsimile or a multifunctional machine, such as, but not limited to a combination copier and facsimile, a combination facsimile and personal computer, or a device capable of scanning, faxing, copying or printing a document.

The control module 22 prioritizes data on a first come first served basis based on a page by page priority. For example, the control module 22 may receive a printing request from the host computer 12 and begin transmitting a print command to the MLPD 14. If a facsimile transmission is being received by the control module 22 at the same time, once a completed page of the facsimile transmission is received, the host computer completes transmitting the page currently being printed by the MLPD 14 and then prints the completed facsimile page. As each successive complete facsimile page is received by the control module 22, it is print in between the printed pages requested from the host computer 12. The result is that the facsimile pages are interleaved with the pages of the printed document. In the event that a facsimile transmission and a print request are received simultaneously by the control module 22, the facsimile transmission is given higher priority and is printed first by the MLPD 14.

Figure 5:
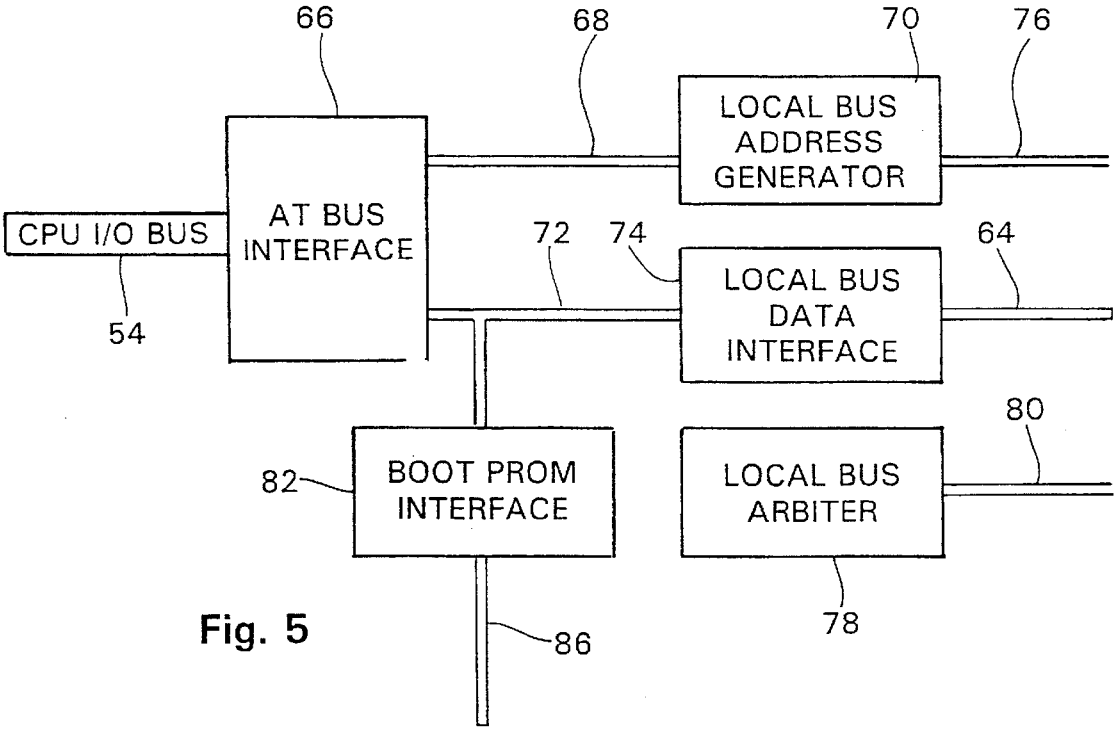
FIG. 5 is a general block diagram of the computer bus interface of the control module of FIG. 4.

Referring specifically to FIG. 5, there is shown a schematic diagram of the computer bus interface 56. The computer bus interface 56 includes an AT bus interface 66 which is generally in accordance with specifications for an IBM or IBM compatible personal computer. The AT bus interface 66 separates data and address information received from the CPU I/O bus 54 and routes the address data via an SA bus 68 to a local address bus generator 70. Data information from the CPU I/O bus 54 is also routed via the AT bus interface 66 over an SD bus 72 to a local bus data interface 74. The local bus address generator 70 and local bus data interface 74 are responsible for reformatting the signals to be compatible with the local address bus 76 and local data bus 64. Access to the local data bus 64 is determined by a conventional local bus arbiter 78 that communicates with each module potentially desiring access to the bus using individual dedicated requesting grant lines 80.

The SD bus 72 is also connected to a boot PROM interface 82. The boot PROM interface 82 connects the SD bus 72 to a boot PROM 84 (FIG. 4) via a PROM bus 86. It is to be understood by those skilled in the art that the boot PROM 84 may alternatively be an electrically erasable PROM (EEPROM) or a mask programmed read only memory (ROM). The boot PROM 84 provides the nonvolatile storage necessary to start up the control module system when power is first applied. During power-up, PROM data is routed via the above-described path to the local bus 64 and through transceivers 88 to the control memory 58 which provides the initial program to operate the control processor 50. During normal operation, speed and efficiency require that the data from the CPU I/O bus 54 be transferred into the control memory 58 via direct memory access (DMA) techniques. Similarly, data must be transferred out of the control memory 58 to the video bus 26 using DMA. DMA techniques are well known to those of ordinary skill in the art, and are used to minimize the processor overhead in transferring data by delegating the transfer sequence to special purpose hardware. In the present invention, a DMA and memory controller provides addresses to the control memory 58 via a memory address bus 92 while data is routed over the local bus 64 through transceivers 88 and the control memory bus 94. The DMA and memory controller 90 support memory operations by providing address interface logic from the local bus address 96, memory control logic to the memory address bus 92, and signals needed to refresh dynamic random access memory (DRAM) integrated circuits used in the control memory 58.

A video bus controller 98 controls data transferred to the MLPD 14 via the video bus 26. High data transfer rates must be sustained between the control module 22 and the MLPD 14 to facilitate rapid printing and document scanning at high resolutions. However, the traditional means of providing high data rates using a parallel data bus has significant disadvantages. These disadvantages are overcome through use of a video bus 26, i.e., a high-speed serial bus with a separate set of control wires that set up fast operations over the bus.

There are two basic mechanisms by which the control module 22 determines the destination of received data signals from the host computer 12. One mechanism is used for the data to be printed and employs predetermined addresses associated with the host computer I/O port assignments. The second mechanism is used for all non-print functions and requires software in the control module 22 to assign addresses in the control module 22 for received data based upon a command word at a predetermined location relative to the start of a defined block of storage in the host computer 12.

As discussed above, the first mechanism relies upon I/O port addresses assigned in the host computer 12. For example, in an MS-DOS operating system, the printing ports are labeled LPT1, LPT2 and LPT3 and are each associated with a fixed hardware address. In a preferred embodiment, particular printer emulations are associated with each printer port name and likewise each host hardware address. For example, LPT1 can be associated with the PostScript printer emulation, LPT2 can be associated with a Hewlett Packard laser emulation and LPT3 can associated with an Epson dot matrix printer emulation.

Data sent by an application program running on the host to LPT1 will be sent on the CPU I/O bus 54 with the hardware address predetermined for the LPT1. The address associated with the LPT1 port is received by the AT bus interface 66 and recognized by the local bus address generator 70 in the control module 22 which in turn latches a predetermined address in the control memory space. The data is routed through the local bus data interface 74 to the predetermined location for that data source.

The first mechanism for routing data is designed so that no special software modifications are necessary to use existing applications within the control module 22. Most conventional application programs have built in means by which a particular printer type can be associated with a particular printer port, although not every application can support every printer type. By supporting multiple printer emulations concurrently through different ports, a variety of applications can be supported without having to frequently manually reassign the printer emulation via software or hardware switches.

The second mechanism for routing data accommodates other modes of control module operation, such as facsimile transmission, when there are no long standing conventions of I/O port addresses. A block address on the host computer 12 is set up to correspond to a block address in the control module memory 58. This correspondence is established by conventional fixed address communication between the host computer software and the control module software. The local bus address generator 70 provides subsequent offsets between the addresses of the host computer memory, as such addresses appear on the CPU I/O bus 54 and the designation addresses on the control module local address bus 96. One of the addresses located within the translated shared address space is reserved for command data. The value of the command data determines how the host data sent to the control memory 58 is treated. For example, one command might signal interpretation of data elsewhere in the block as a phone number to be dialed for a fax transmission.

Figure 6:
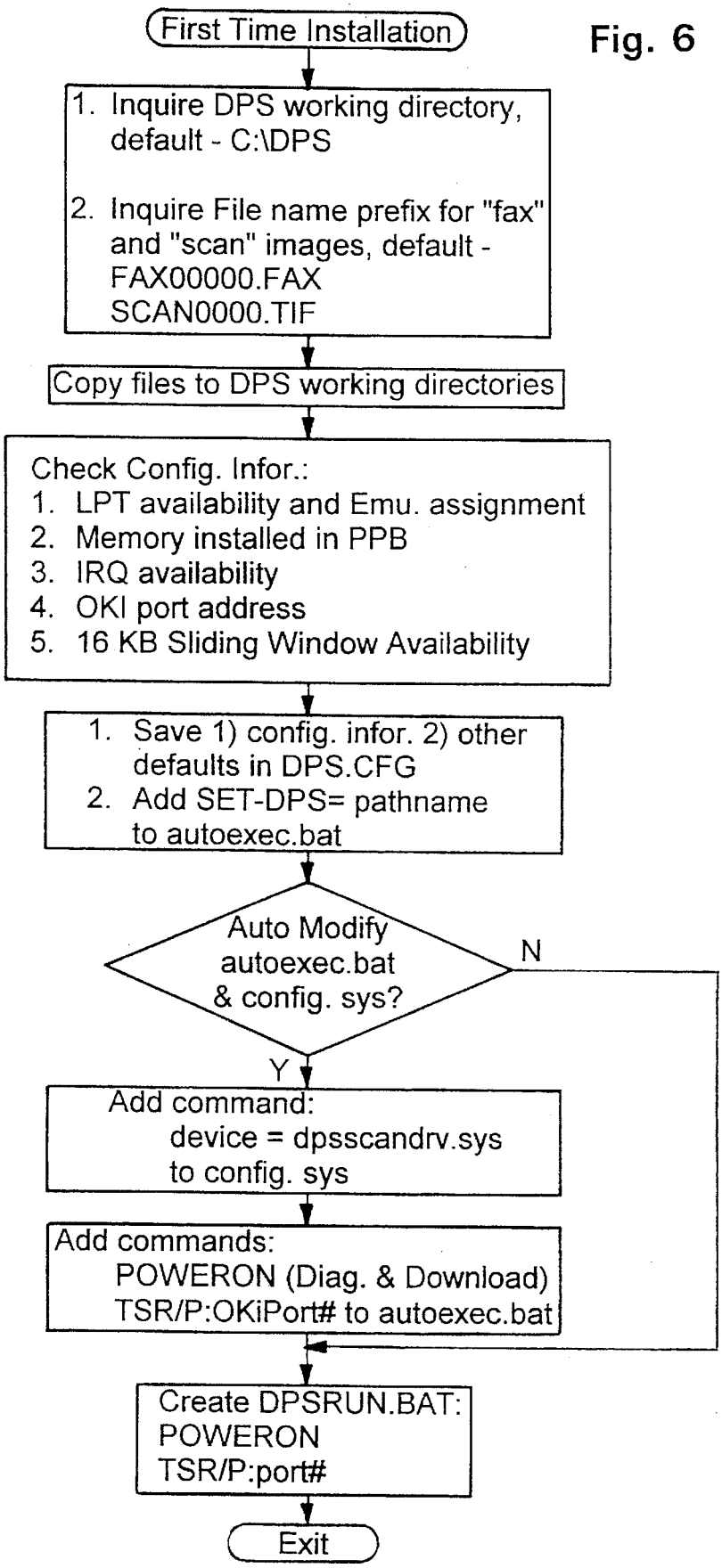
FIGS. 6–18 are flow charts depicting the software implementations of the control module.
Figure 7:
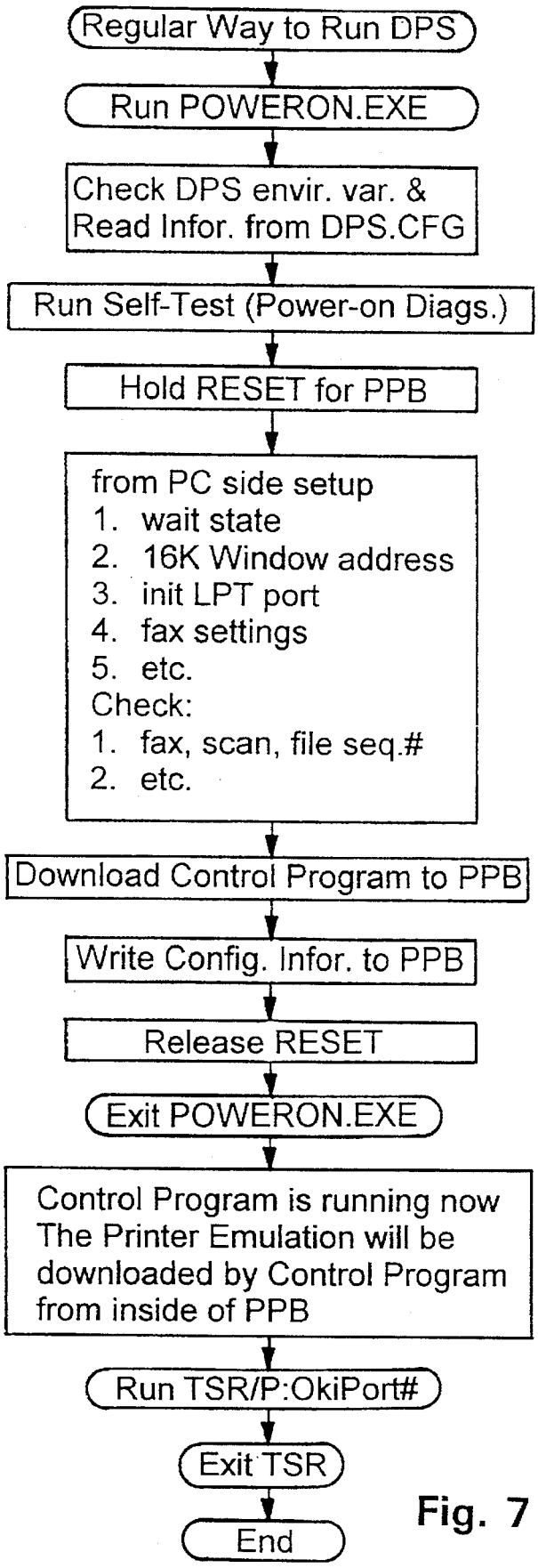

Referring specifically to FIGS. 6–18, there are shown flow charts depicting the operation of the control module 22. Referring to FIG. 6, there is shown a flow chart depicting the installation procedure for initializing the document processing system 10 and, more particularly, for installing the software into the host computer 12. The installation process includes transferring the directories into the host computer 12 and running a check on the software. FIG. 7 illustrates a flow chart directed to running the document processing system 10. Included in the running procedure is the performance of a self test to check the integrity of the software and to transfer the control program to the control module 22.

Figure 8:
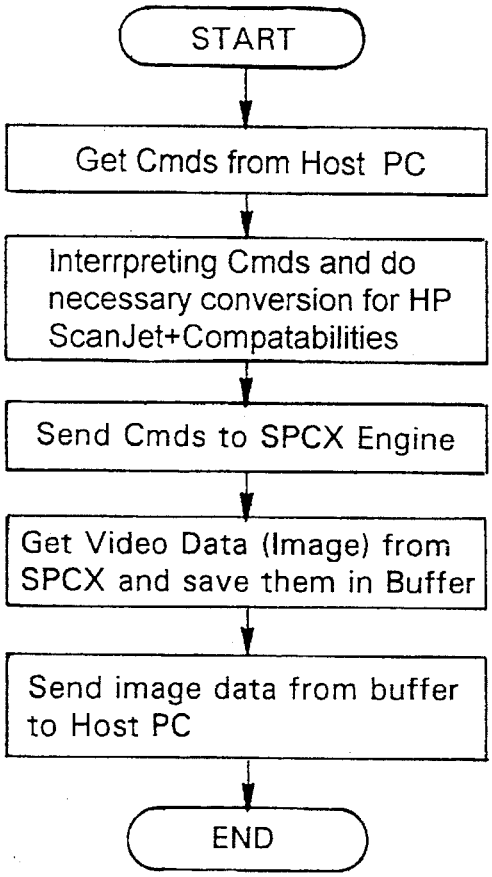

Referring to FIG. 8, there is shown a flow chart of the software implemented by the control module 22 to perform a scan function. The control module receives scan commands from the host computer 12 which are transferred to the MLPD 14. Once the document is scanned, the video data is transmitted from the MLPD 14 to the host computer 12 by the control module.

Figure 9:
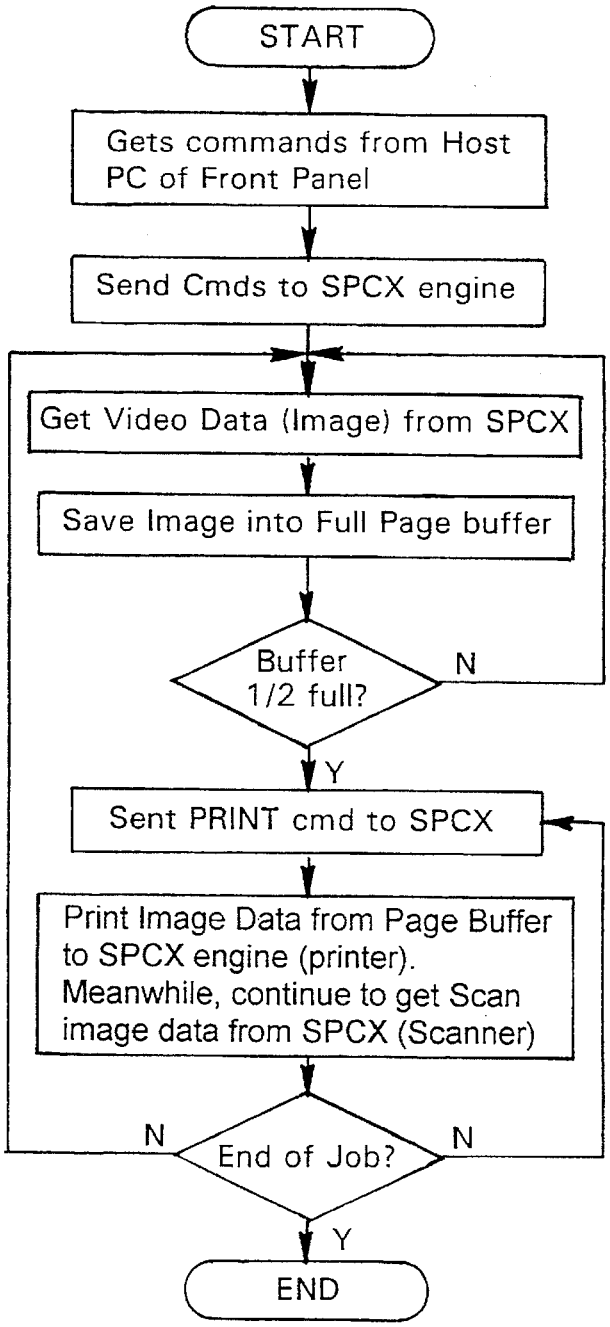

Referring to FIG. 9, there is shown a flow chart of the software implemented by the control module 22 to perform a copy function. The control module transmits copy commands from the host computer 12 to the MLPD 14. The print image is saved in a page buffer and is printed by the MLPD 14 once half of the data is stored within the buffer.

Figure 10:
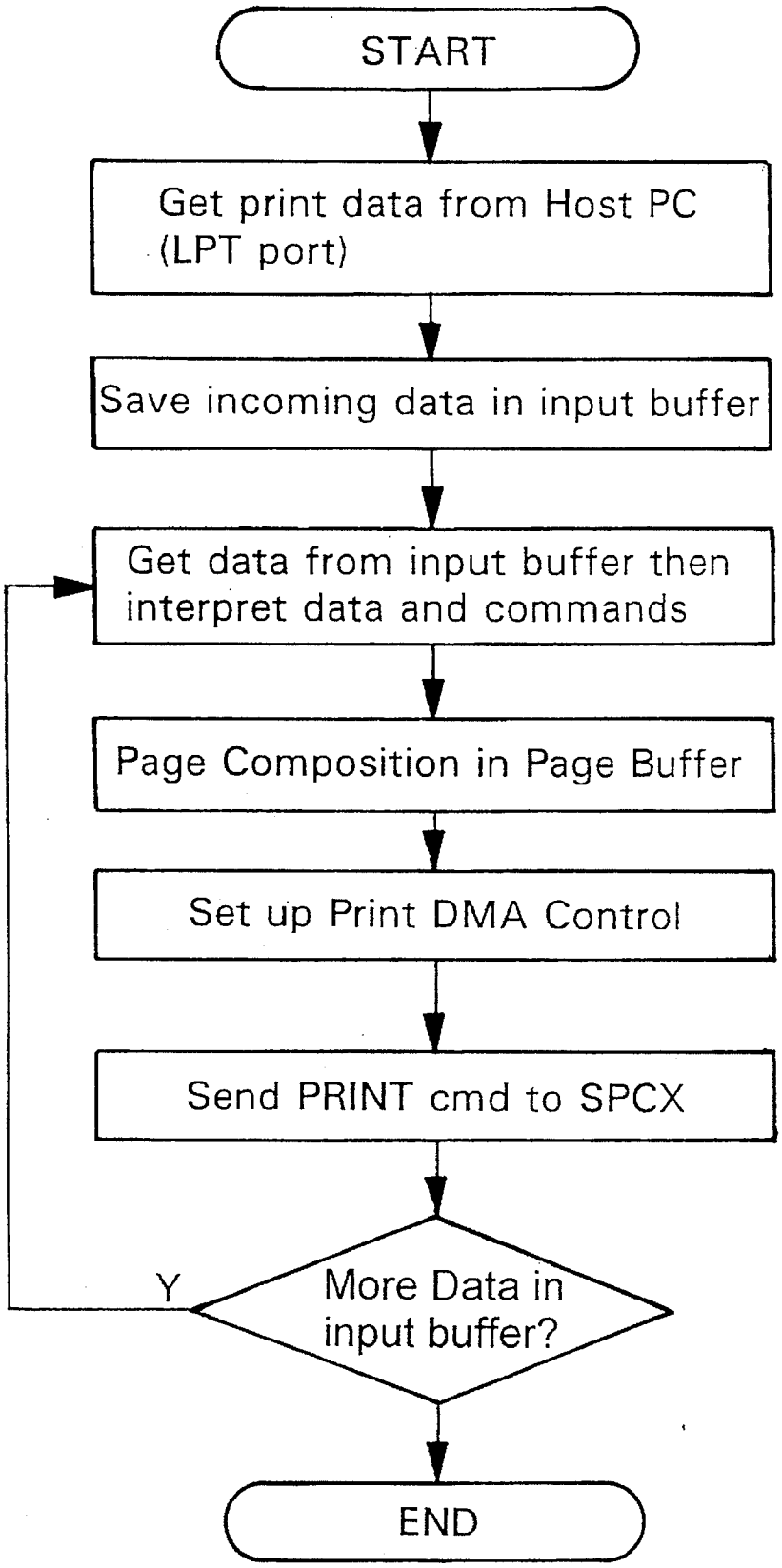

Referring to FIG. 10, there is shown a flow chart of the software implemented by the control module 22 to perform a print function. The control module 22 receives print data from the host computer 12. The print data is saved in an input buffer and composed into a page format. The formatted print data is transmitted to the MLPD 14 which prints the selected document.

Figure 11:
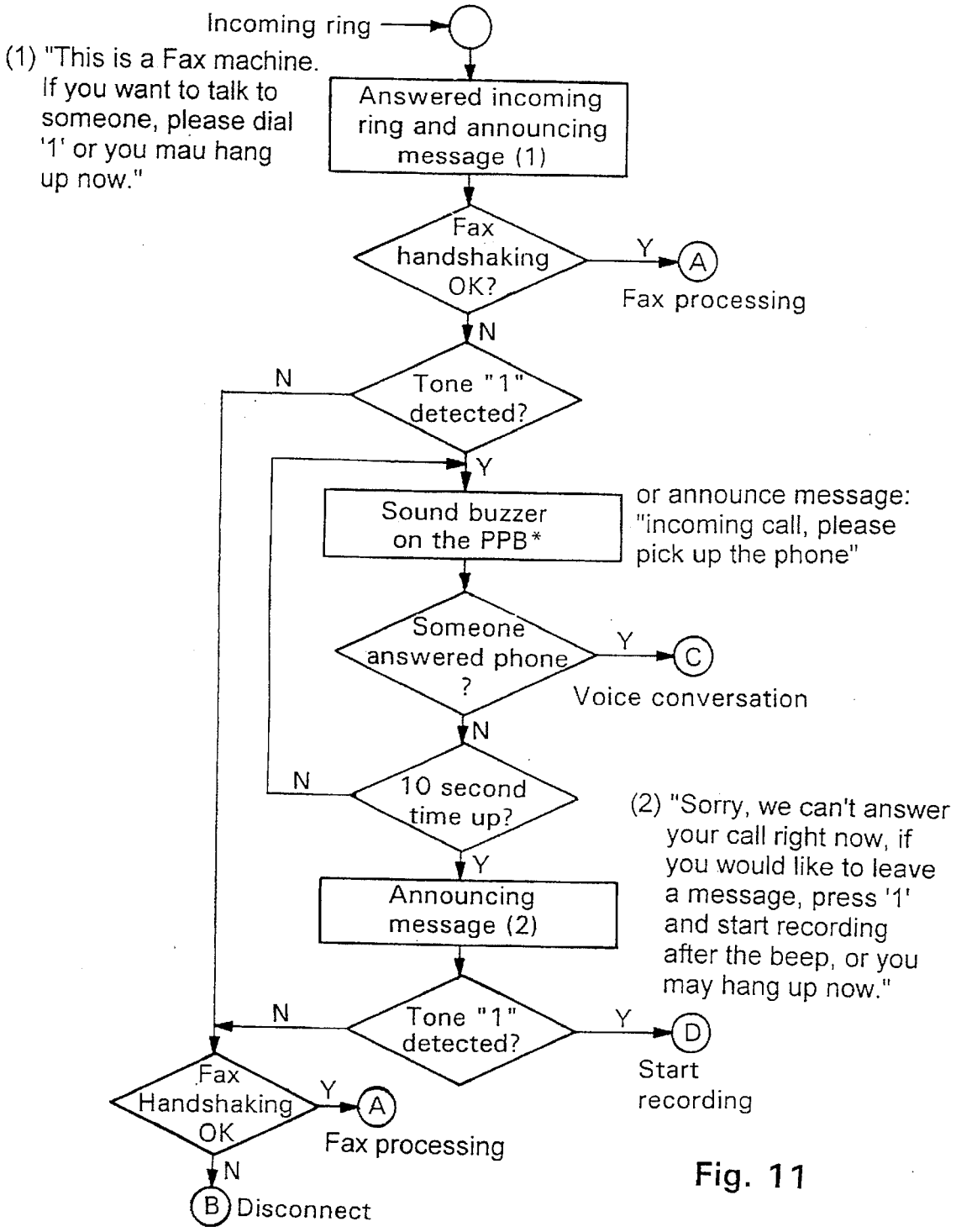

Referring specifically to FIGS. 11–18, there are shown flow charts of the various software subroutines necessary for faxing a document. Referring to FIG. 11, there is shown a flow chart of the faxing and voice switching operations. When an incoming call is received, it is first determined whether the call is a facsimile transmission or a voice transmission. If the call is a facsimile transmission, the facsimile is processed accordingly. If the call is a voice transmission, the call is either directed to a telephone handset or the call is answered by a machine which allows the caller to leave a recorded message.

Figure 12:
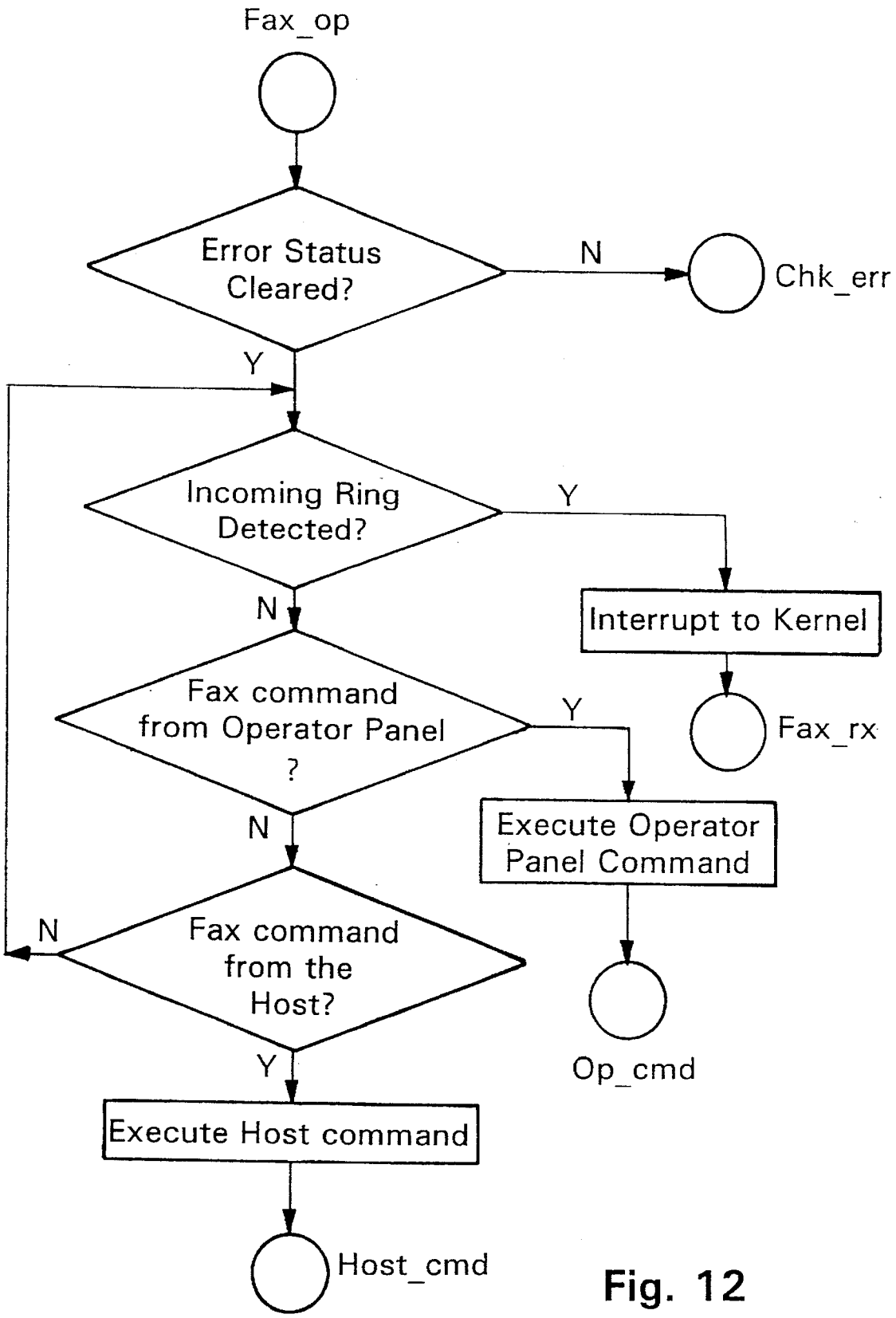
Figure 13:
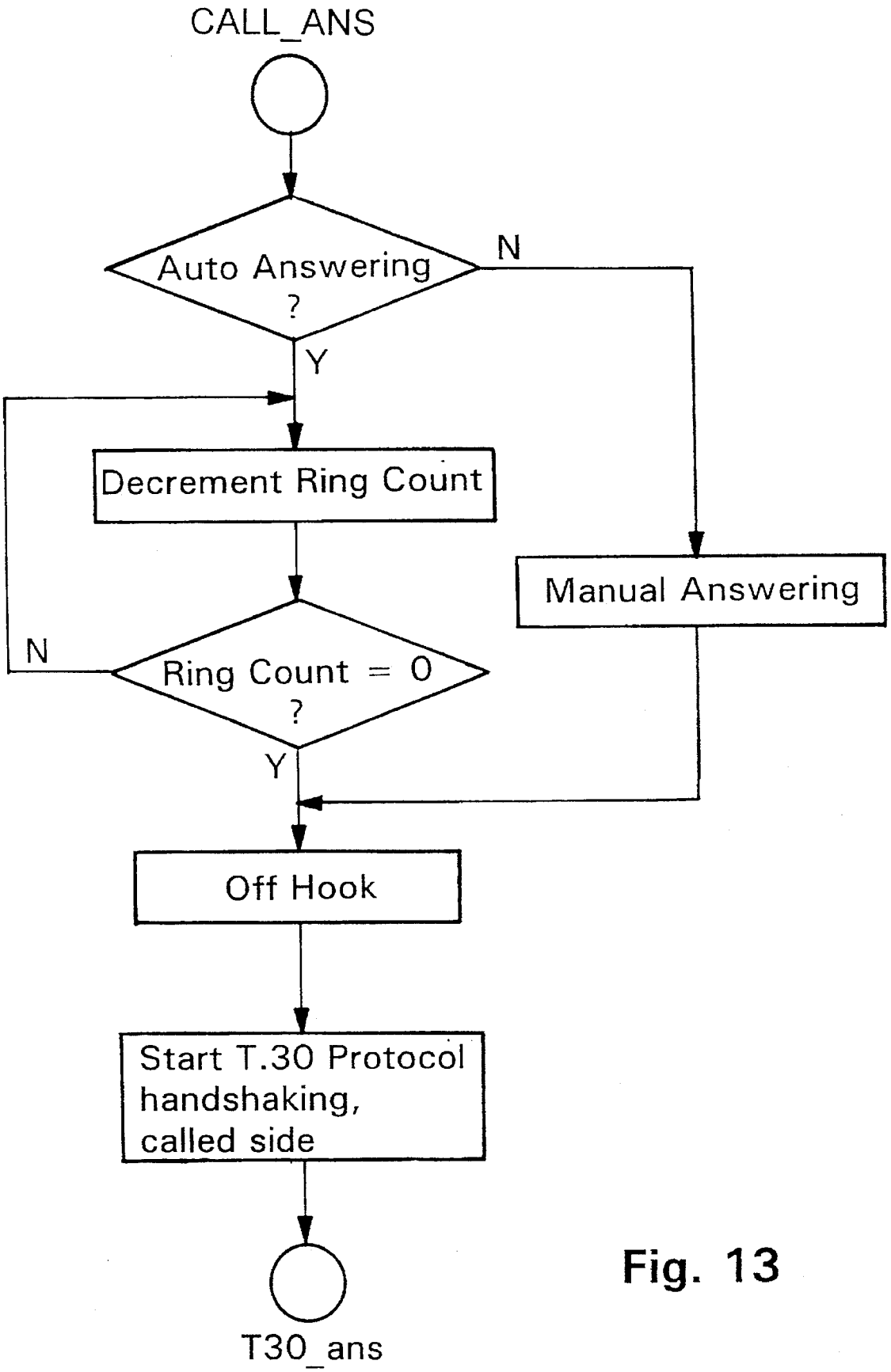

FIG. 12 is a flow chart depicting the status monitoring process of the control module 22. The status monitor detects if there is an error in the system, if an incoming call is being received or if a request is being made to transmit a facsimile from the MLPD 14. FIG. 13 is a flow chart depicting the call answering procedure performed by the control module 22. A facsimile call can either be answered automatically or manually.

Figure 14:
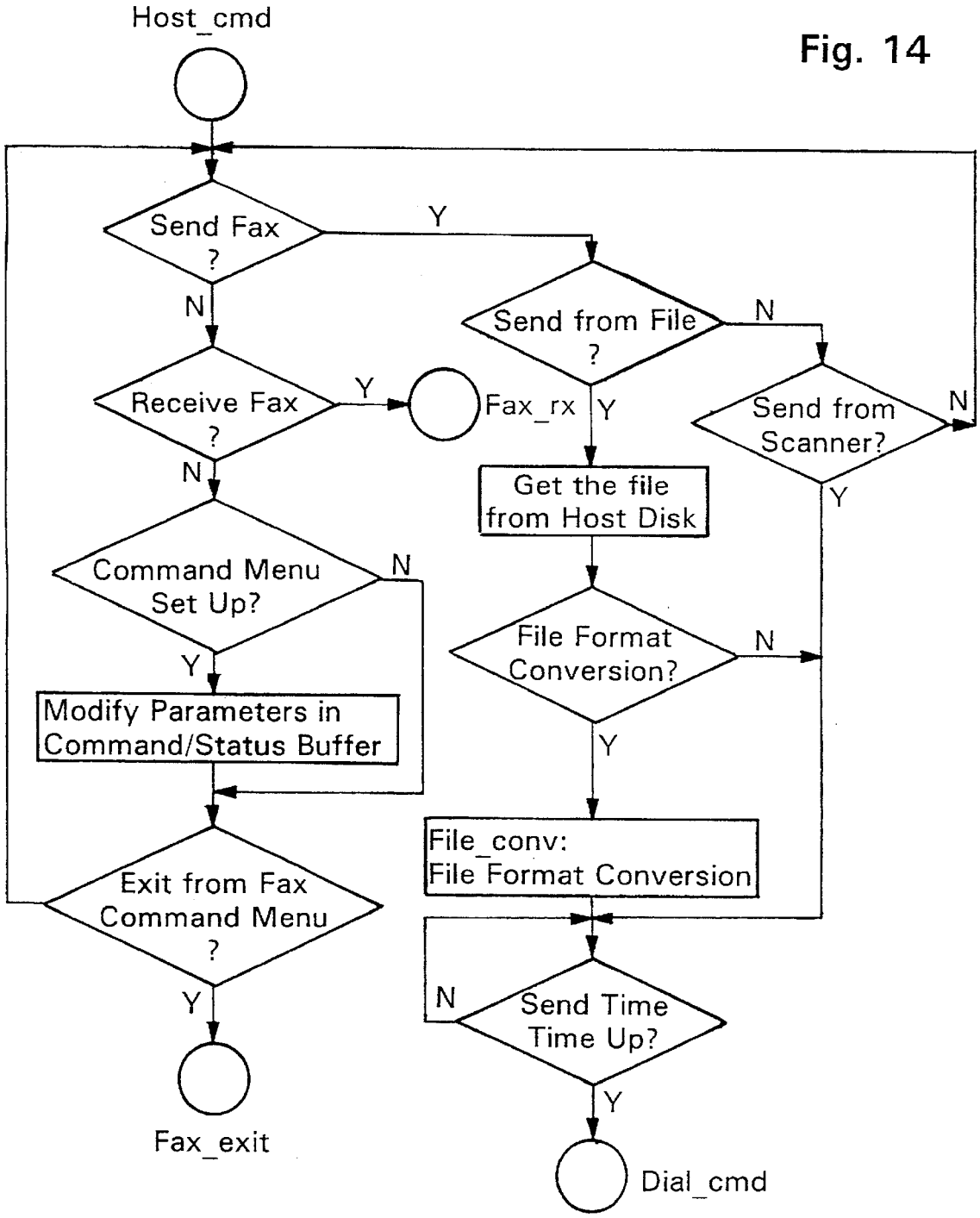
Figure 15:
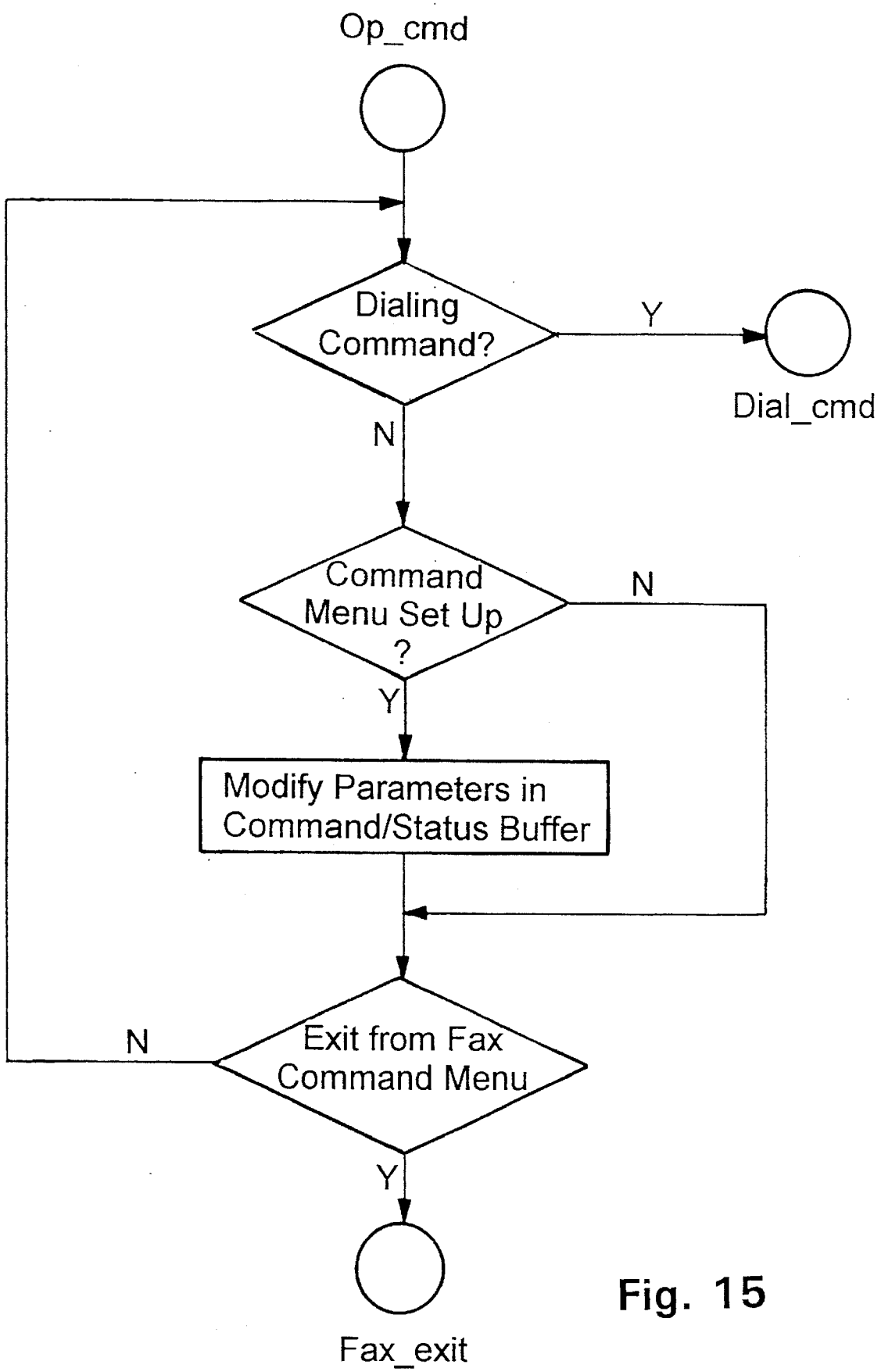

FIG. 14 is a flow chart directed to the fax command execution procedure performed by the host computer 12. The host computer 12 determines whether or not to transmit a fax and whether the fax is to be transmitted from the host memory or from the scanner associated with the MLPD 14. FIG. 15 is a flow chart depicting the fax command execution procedure by the operator panel. The control module 22 detects when a dial command is initiated by the operator for transmitting a facsimile transmission to a remote device 16.

Figure 16:
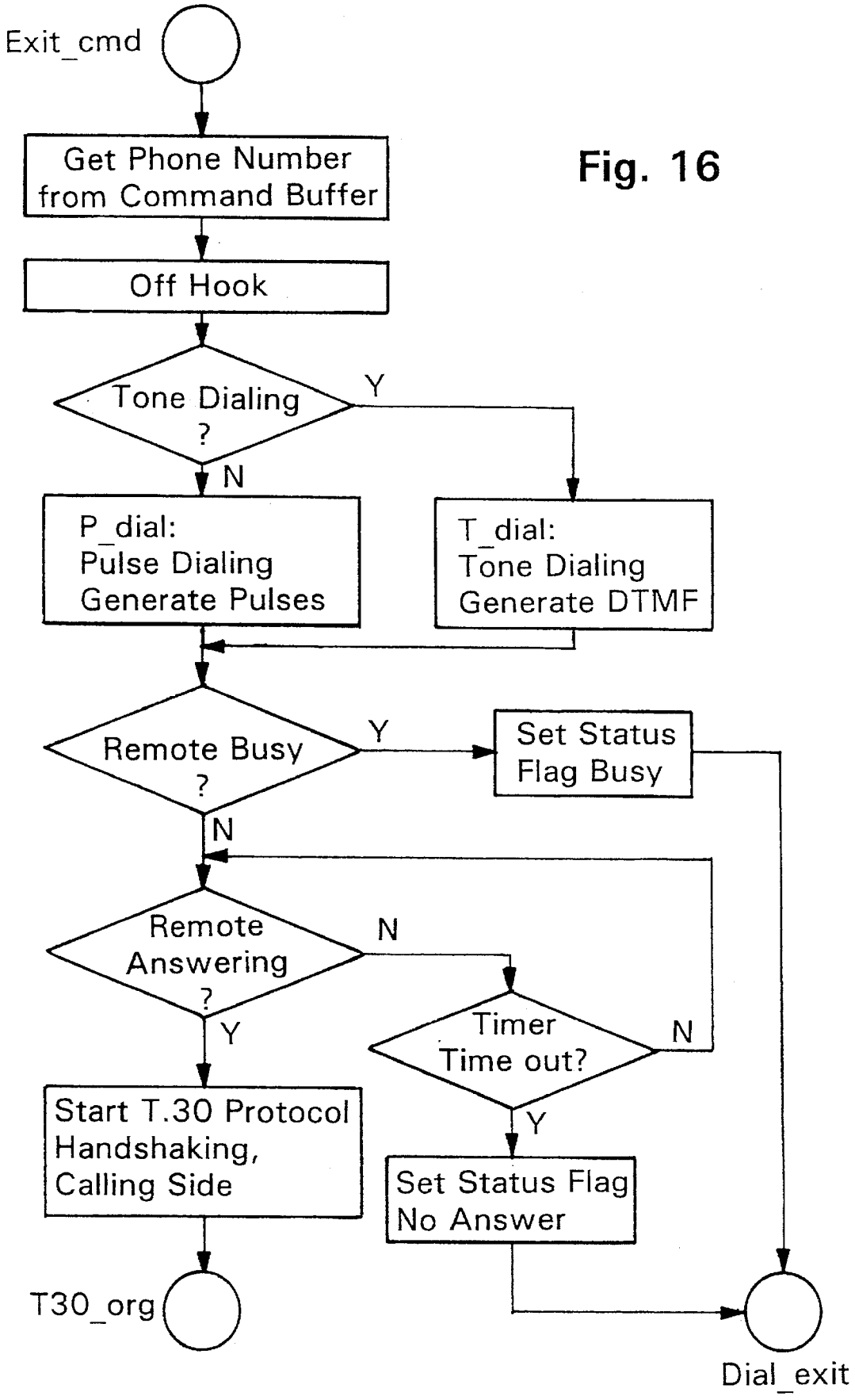

Referring to FIG. 16, there is shown a flow chart depicting a dial command execution procedure. The control module is capable of pulse dialing or tone dialing to a remote location. The control module 22 detects whether a busy signal is incurred or if the call is answered. If the call is answered, the controlling module initiates a handshaking protocol for transmitting a fax.

Figure 17:
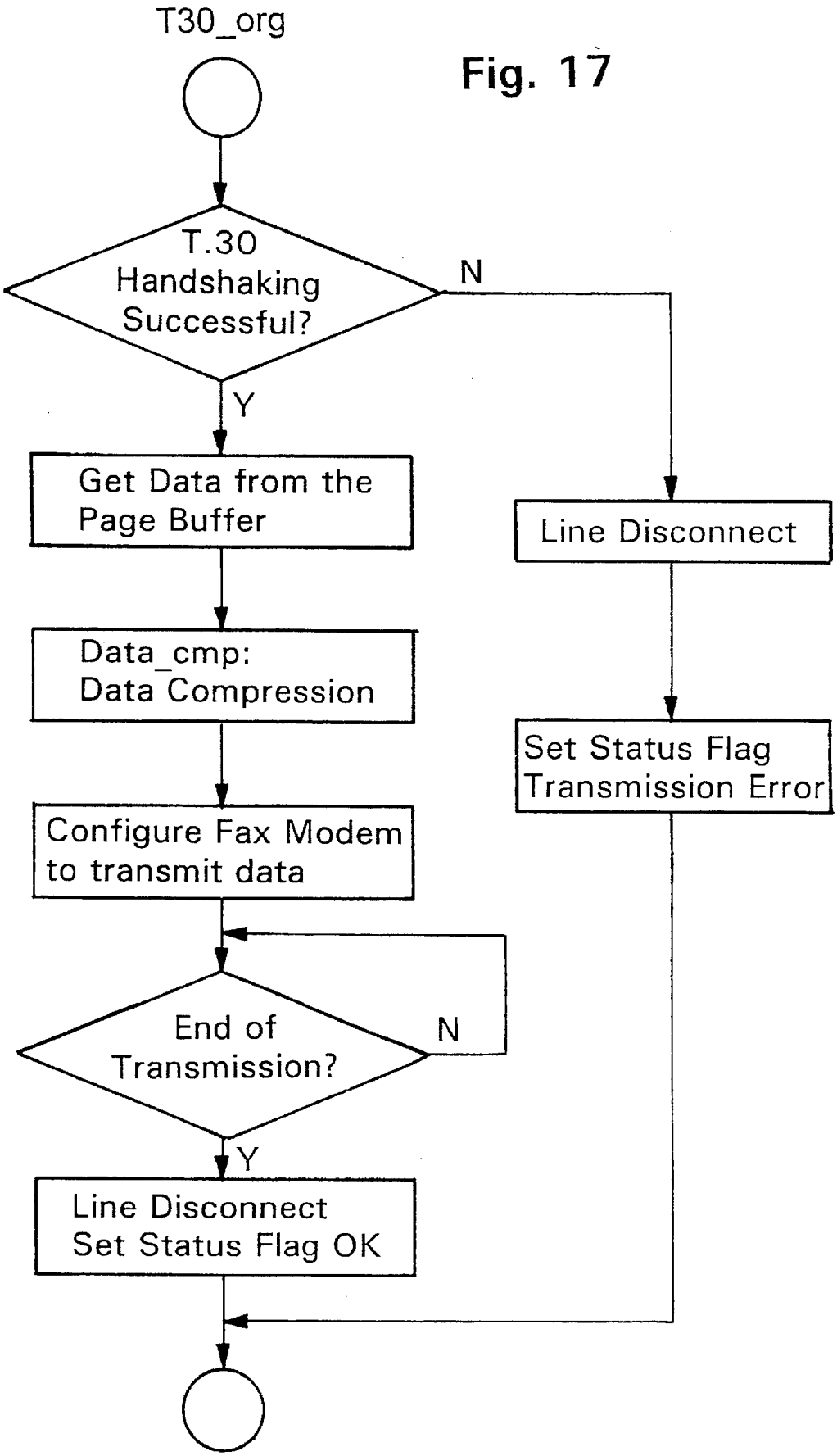
Figure 18:
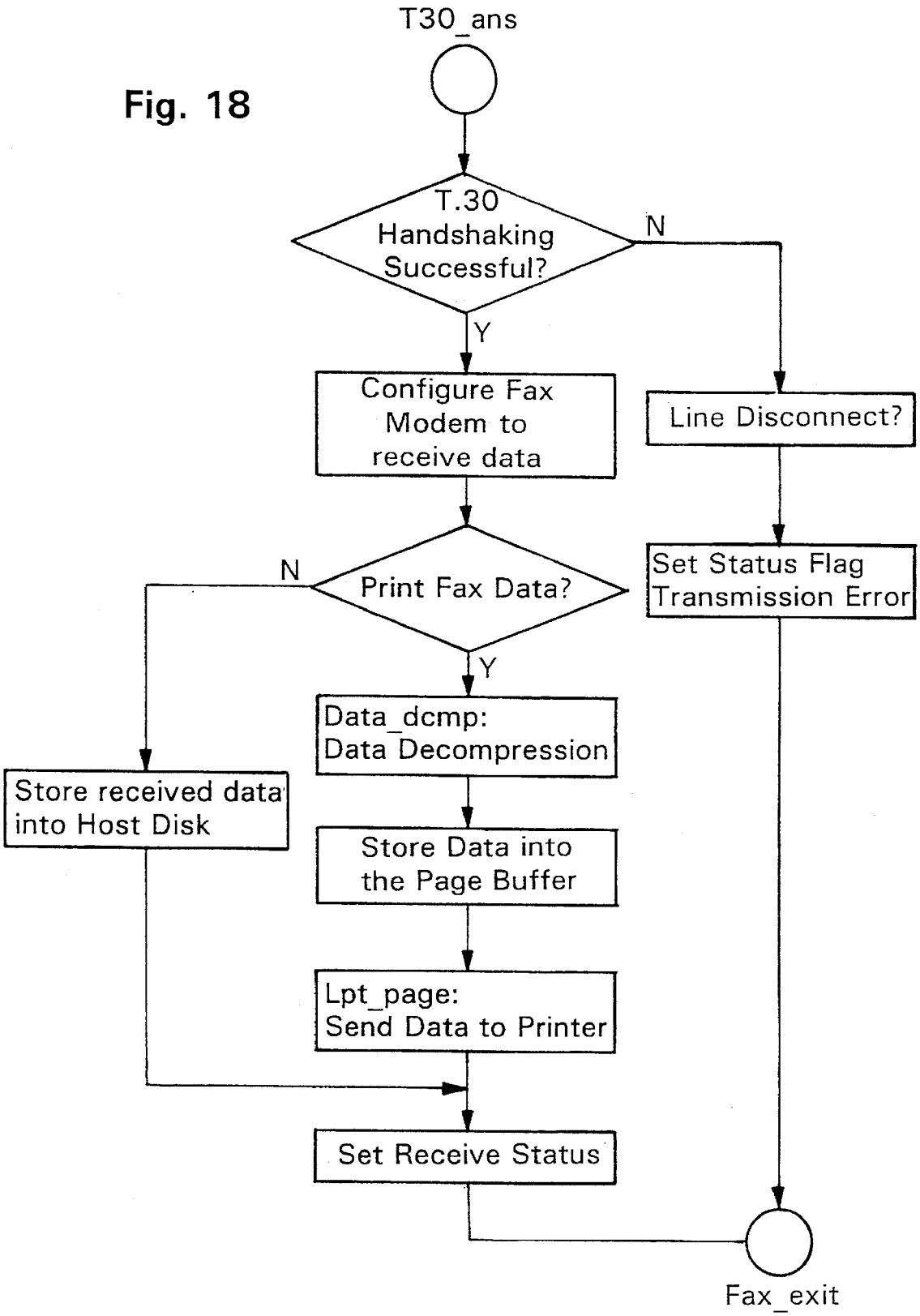

FIG. 17 is a flow chart depicting the fax data transmitting procedure. The control module 22 retrieves the fax data from a page buffer and compresses the data for facsimile transmission by using known techniques. The data is received by the fax modem 52 which transmits the fax to a remote device 16. FIG. 18 is a flow chart depicting the fax data receiving procedure. Once a call is received from a remote device 16 and the handshaking protocol is completed, the fax modem 52 is configured so that data can be received. The received fax data is either decompressed and stored within a page buffer to be printed or is stored within the host memory.

From the foregoing description, it can be seen that the present invention is directed to a control module for controlling the operation of a multifunctional peripheral device based on data signals received from or transmitted to an auxiliary device. It will be recognized by those skilled in the art that changes may be made to the above-described embodiment of the invention without departing from the broad inventive concept thereof. It is understood, therefore, that this invention is not limited to the particular embodiment disclosed, but is intended to cover all modifications which are within scope and spirit of the invention as defined by the appended claims.

We claim:

1. A control module comprising:

a data transceiver arranged to receive data from at least one auxiliary device associated with the control module and to convert the received data to first document signals, the data transceiver also arranged to convert second document signals from a host computer to converted data and to transmit the converted data to the auxiliary device;

a data processor arranged to process received data;

a data storage device arranged to store received data;

a video converter arranged to convert received data into video data signals, and to transmit video data signals to a self-contained multifunctional peripheral device including a scanner and a printer, the scanner for optically scanning document information and for converting the scanned document information into third document signals, the multifunctional peripheral device transmitting the third document signals to the control module and receiving fourth document signals from the control module, the printer for producing a recorded form of document information based on the received fourth document signals, the control module being an intelligent controller controlling and operating the multifunctional peripheral device; and a computer bus interface interconnecting the control module with the host computer by way of a host computer CPU I/O bus;

the control module being a self-contained unit selected from the group consisting of a plug-in printed circuit card disposed within the host computer, a plug-in printed circuit card disposed within the multifunctional peripheral device, or a plug-in printed circuit card disposed within a separate stand-alone unit;

the control module transmitting three types of document signals to the multifunctional peripheral device over an MPD interface, the third type of signal instructing the multifunctional peripheral device to print a particular document based upon particular document signals received from the host computer, the fourth type of signals instructing the multifunctional peripheral device to scan a particular document utilizing the scanner and to transmit the document signals from the scanner to the host computer, and a first type of signals acting as command and response communications to the multifunctional peripheral device, including printer, scanner, and data flow control signals, all signals from the multifunctional peripheral device in response to the transmitted signals also being transmitted over the MPD interface;

the control module for receiving the third document signals from the multifunctional peripheral device and the first document signals from the auxiliary device and for sending the received third and first document signals to the host computer, the control module also for receiving the fourth document signals and the second document signals from the host computer, for sending the received fourth document signals to the multifunctional local peripheral device and for sending the received second document signals to the auxiliary device, the control module functioning to require that the third document signals from the local device and the first document signals from the auxiliary device be transmitted to the host computer, that the fourth document signals from the host computer be transmitted to the local device, and that the second document signals from the host computer be transmitted to the auxiliary device.

2. A control module according to claim 1, wherein said video data signals are in a serial data format.

3. A control module according to claim 1, further comprising facsimile compression means for compressing facsimile data received by the multifunctional peripheral device and for transmitting the compressed facsimile data to a remote source associated with the control module.

4. A control module according to claim 1, further comprising facsimile data decompression means for receiving facsimile data from a remote source, decompressing the data and transmitting the decompressed data to the multifunctional peripheral device.

5. A control module according to claim 1, further comprising printer language control means for determining a print type to be implemented by the multifunctional peripheral device.

6. A control module according to claim 1, wherein said auxiliary device is a host computer associated with the control module.

7. A control module according to claim 1, wherein said auxiliary device is a telephone line which connects a remote data source to the control module.

8. A control module according to claim 1, further comprising data transmitting means for transmitting data from the control module to an auxiliary device.

9. A control module according to claim 1, further comprising a central data bus for transmitting and receiving data signals from the control module.

10. A control module comprising:

a central data bus for accessing a plurality of functional modules;

a computer interface arranged to interconnect a host computer with said control module via said central data bus, said host computer providing digital data signals and compressed data signal inputs to the control module;

a facsimile modem for receiving analog facsimile data from a remote source via a telephone line and converting said received analog facsimile data into first document signals, and for converting second document signals from the host computer into analog facsimile data and transmitting the converted analog facsimile data to a remote source via the telephone line;

a voice recorder for receiving analog voice data signals from a remote source via a telephone line and converting said analog voice data signals into digital data signals;

a control processor arrange to process the data signals received from said host computer, said fax modem and said voice recorder;

a control memory arranged to store the data signals received from said host computer, said facemile modem and said voice recorder; and a video interface arranged to receive said data signals and to convert said data signals into video signals, said video interface transmitting said video signals to a self-contained multifunctional peripheral device via a video bus, the multifunctional peripheral device including a scanner and a printer, the scanner for optically scanning document information and for converting the scanned document information into third document signals, the multifunctional peripheral device transmitting the third document signals to the control module and receiving fourth document signals from the control module, the printer for producing a recorded form of document information based on the received fourth document signals;

the control module being an intelligent controller controlling and operating the multifunctional peripheral device, the control module being interfaced with a host computer by way of a host computer CPU I/O bus, and the control module being a self-contained unit selected from the group consisting of a plug-in printed circuit card disposed within the host computer, a plug-in printed circuit card disposed within the multifunctional peripheral device, or a plug-in printed circuit card disposed within a separate stand-alone;

the control module transmitting three types of document signals to the multifunctional peripheral device over an MPD interface, the third type of signal instructing the multifunctional peripheral device to print a particular document based upon particular document signals received from the host computer, the fourth type of signals instructing the multifunctional peripheral device to scan a particular document utilizing the scanner and to transmit the document signals from the scanner to the host computer, and a first type of signals acting as command and response communications to the multifunctional peripheral device, including printer, scanner, and data flow control signals, all signals from the multifunctional peripheral device in response to the transmitted signals also being transmitted over the MPD interface;

the control module for receiving the third document signals from the multifunctional peripheral device and the first document signals from the remote source by way of the facsimile modem and for sending the received third and first document signals to the host computer, the control module also for receiving the fourth document signals and the second document signals from the host computer, for sending the received fourth document signals to the multifunctional local peripheral device and for sending the received second document signals to the remote device by way of the facsimile modem, the control module functioning to require that the third document signals from the local device and the first document signals from the remote source be transmitted to the host computer, that the fourth document signals from the host computer be transmitted to the local device, and that the second document signals from the host computer be transmitted to the remote source.

11. A control module according to claim 10, wherein said central bus is capable of transmitting data signals to said host computer and said remote device as well as receiving data signals from said host computer and remote device.

12. A control module according to claim 10 wherein said video signals are in a serial data format.

* * * * *